(12) United States Patent
Cho et al.

(10) Patent No.: US 11,584,683 B2
(45) Date of Patent: Feb. 21, 2023

(54) METHOD OF FABRICATING A METAL THIN FILM SUPPORTED BY A GLASS SUPPORT

(71) Applicant: CORNING INCORPORATED, Corning, NY (US)

(72) Inventors: Seo-Yeong Cho, Suwon-si (KR); Kyung-jin Lee, Cheonan-si (KR); Yoon-seuk Oh, Cheonan-si (KR); Jun Ro Yoon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 655 days.

(21) Appl. No.: 16/491,363

(22) PCT Filed: Mar. 9, 2018

(86) PCT No.: PCT/KR2018/002830
§ 371 (c)(1),
(2) Date: Apr. 14, 2020

(87) PCT Pub. No.: WO2018/164535
PCT Pub. Date: Sep. 13, 2018

(65) Prior Publication Data
US 2020/0407272 A1    Dec. 31, 2020

(30) Foreign Application Priority Data

Mar. 9, 2017  (KR) .......................... 10-2017-0030149
Mar. 8, 2018  (KR) .......................... 10-2018-0027639

(51) Int. Cl.
*C03C 15/00*     (2006.01)
*C03C 17/36*     (2006.01)
*C03C 21/00*     (2006.01)

(52) U.S. Cl.
CPC .......... *C03C 17/3634* (2013.01); *C03C 15/00* (2013.01); *C03C 21/002* (2013.01); *C03C 2217/26* (2013.01); *C03C 2217/282* (2013.01)

(58) Field of Classification Search
None
See application file for complete search history.

(56) References Cited

U.S. PATENT DOCUMENTS 4,547,432 A * 10/1985 Pitts .................... C23C 14/022
                                                      427/595
6,479,395 B1   11/2002 Smith et al.
(Continued)

FOREIGN PATENT DOCUMENTS

CN    104755441 A    7/2015
CN    105473522 A    4/2016
(Continued)

OTHER PUBLICATIONS

Chinese Patent Application No. 201880025768.0, Office Action dated Aug. 30, 2021, 6 pages (3 pages of English Translation and 3 pages of Original Document), Chinese Patent Office.
(Continued)

*Primary Examiner* — Shamim Ahmed
(74) *Attorney, Agent, or Firm* — Svetlana Short

(57) ABSTRACT

A method of fabricating a metal thin film-on-glass structure. A glass substrate, on a top surface of which a layer is formed, is prepared. A local area of the glass substrate is etched from a bottom of the glass substrate to expose the layer downwardly, thereby forming an exposed area of the layer. The layer is a metal thin film. The etching includes first-etching the glass substrate to a depth less than a thickness of the glass substrate using a first etching solution containing hydrofluoric acid and at least one of nitric acid and sulfuric acid, resulting in a first-etched portion of the glass substrate; and second-etching the first-etched portion of the glass substrate using an etching solution containing hydrofluoric acid without nitric acid or sulfuric acid, so that the layer is exposed downwardly, whereby the metal thin film is supported by a remaining portion of the glass substrate.

21 Claims, 4 Drawing Sheets

(56) References Cited

U.S. PATENT DOCUMENTS

| | | | |
|---|---|---|---|
| 7,390,422 B2 | 6/2008 | Yoo et al. | |
| 2007/0184354 A1* | 8/2007 | Chandrachood | G03F 1/80 |
| | | | 430/5 |
| 2008/0233759 A1 | 9/2008 | Lee et al. | |
| 2011/0297873 A1* | 12/2011 | Kuroiwa | C23F 1/44 |
| | | | 252/79.3 |
| 2014/0162036 A1* | 6/2014 | Marcellus | B32B 17/10018 |
| | | | 156/60 |
| 2014/0285224 A1* | 9/2014 | Albuschies | B82Y 40/00 |
| | | | 438/49 |
| 2016/0141498 A1 | 5/2016 | Ghosh et al. | |

FOREIGN PATENT DOCUMENTS

| | | | |
|---|---|---|---|
| JP | 07235750 | A | 9/1995 |
| JP | 2002-075847 | A | 3/2002 |
| JP | 2012508965 | A | 4/2012 |
| JP | 4964523 | B2 | 7/2012 |
| JP | 2014005172 | A | 1/2014 |
| KR | 10-0652062 | B1 | 12/2006 |
| KR | 1033174 | B1 | 5/2011 |
| KR | 1020120140481 | A | 12/2012 |
| KR | 10-2015-0064192 | A | 6/2015 |
| KR | 1679034 | B1 | 11/2016 |
| KR | 1020170019151 | A | 2/2017 |

OTHER PUBLICATIONS

International Search Report of the International Searching Authority; PCT/KR2018/002830 dated Jun. 28, 2018; 2 Pages; Korean Patent Office.

\* cited by examiner

METHOD OF FABRICATING A METAL THIN FILM SUPPORTED BY A GLASS SUPPORT

BACKGROUND

Field

The present disclosure relates to a method of fabricating a metal thin film-on-glass structure. More particularly, the present disclosure relates to method of fabricating a metal thin film-on glass structure in which a local area of a glass substrate, on the top surface of which a layer including a metal thin film is formed, is removed by etching.

Description of Related Art

There are a range of technical fields in which metal thin films are required. Furthermore, a variety of technical fields need metal thin films having a thickness in the range of nanometers to micrometers.

FIG. 1 schematically illustrates a conventional method of fabricating a metal thin film 21 supported by a glass support 10b.

As illustrated in FIG. 1, the metal thin film 21 supported by the glass support 10b is fabricated by welding the glass support 10b, made by making a local hole in a glass substrate 10, to the free-standing metal thin film 21. However, it may be difficult to fabricate a free-standing metal thin film having a thickness in the range of nanometers to micrometers. Even in the case that a free-standing metal thin film is fabricated, there may still be limitations, in that fabrication costs may be inefficiently high, and may be difficult to handle the free-standing metal thin film.

Accordingly, the method illustrated in FIG. 1 is not practical as a method of fabricating the metal thin film 21 supported by the glass substrate 10b, and other methods that can overcome the above-mentioned limitations are required.

SUMMARY

Nom Various aspects of the present disclosure provide a metal thin film supported by a glass support.

According to an aspect, a method of fabricating a metal thin film-on-glass structure may include: preparing a glass substrate, on a top surface of which a layer is formed; and etching a local area of the glass substrate from a bottom of the glass substrate to expose the layer downwardly, thereby forming an exposed area of the layer. The layer may be a metal thin film. The etching step may include: first-etching the glass substrate to a depth less than a thickness of the glass substrate using a first etching solution containing hydrofluoric acid and at least one of nitric acid and sulfuric acid, resulting in a first-etched portion of the glass substrate; and second-etching the first-etched portion of the glass substrate using an etching solution containing hydrofluoric acid without nitric acid or sulfuric acid, so that the layer is exposed downwardly, whereby the metal thin film is supported by a remaining portion of the glass substrate.

As set forth above, a metal thin film having a thickness in the range of nanometers to micrometers and supported by a glass support can be fabricated.

In addition, it is possible to selectively etch a glass substrate while minimizing damage to the metal thin film.

Furthermore, since damage to the metal thin film by the etching solution is minimized, the thickness of a barrier layer can be minimized, and the thickness of the metal thin film can also be reduced.

In addition, relatively greater deviations in thickness of the glass substrate are possible, thereby reducing costs required for the manufacturing of a precision glass substrate allowing relatively low deviations only.

The methods and apparatuses of the present disclosure have other features and advantages that will be apparent from or that are set forth in greater detail in the accompanying drawings which are incorporated herein, and in the following Detailed Description, which together serve to explain certain principles of the present disclosure.

DETAILED DESCRIPTION

Hereinafter, exemplary embodiments of the present disclosure will be described in detail with reference to the accompanying drawings.

Terms relating to orientations, such as "upper surface," "lower surface," "upward direction," and "downward direction," may be used herein for the ease of description of specific components with reference to the drawings. It should be understood, however, that these terms are not intended to indicate actual orientations. For example, the terms "upper surface" and "lower surface" are only used to describe that an upper surface and a lower surface are opposite each other. In actual practice, the upper surface may be located at a lower location than the lower surface.

Exemplary embodiments relate to a selective substrate etching process that can minimize damage to a metal thin film formed on a glass substrate to a thickness in the range of nanometers to micrometers.

Figure 1:
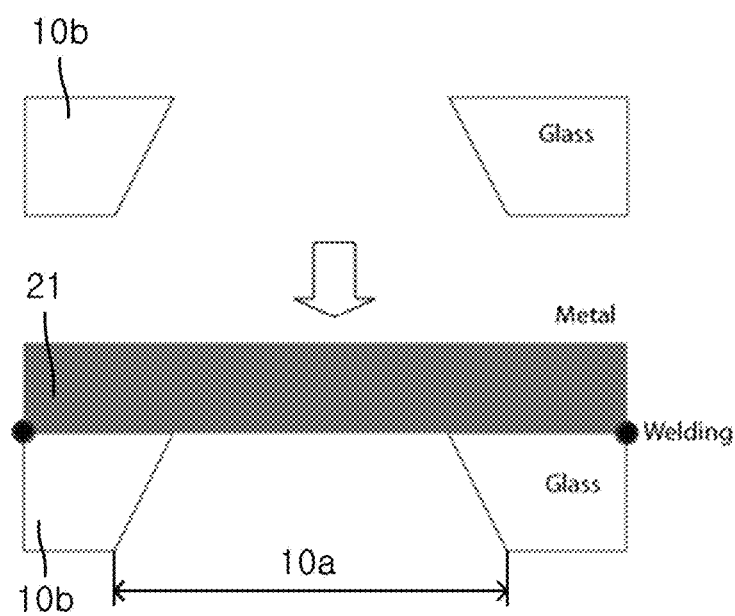
FIG. 1 schematically illustrates a conventional method of fabricating a metal thin film supported by a glass support.
Figure 2:
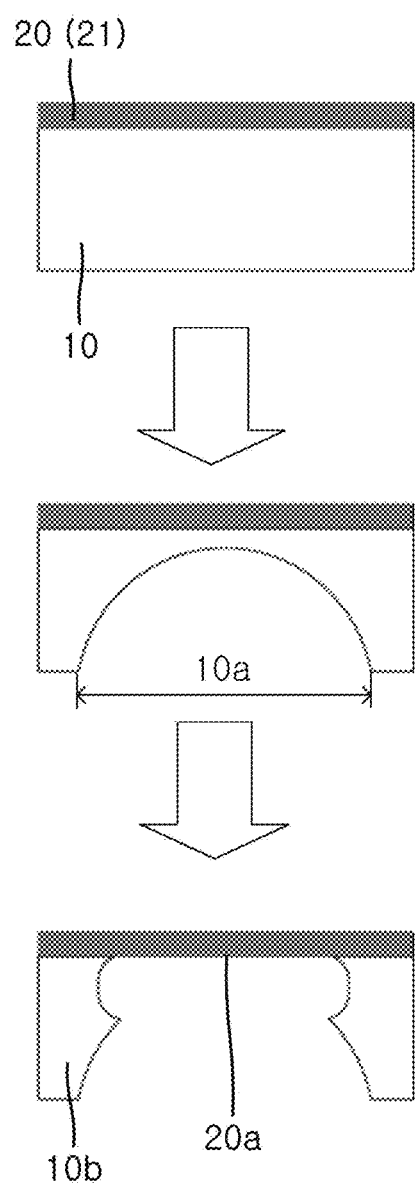
FIG. 2 schematically illustrates a method of fabricating a metal thin film supported by a glass support according to a first embodiment.
Figure 3:
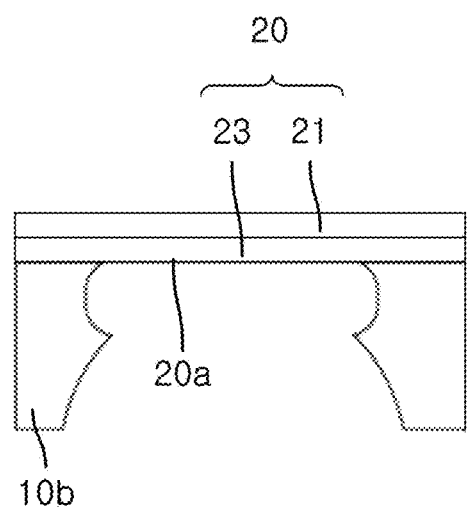
FIG. 3 schematically illustrates a metal thin film supported by a glass support according to a second embodiment.
Figure 4:
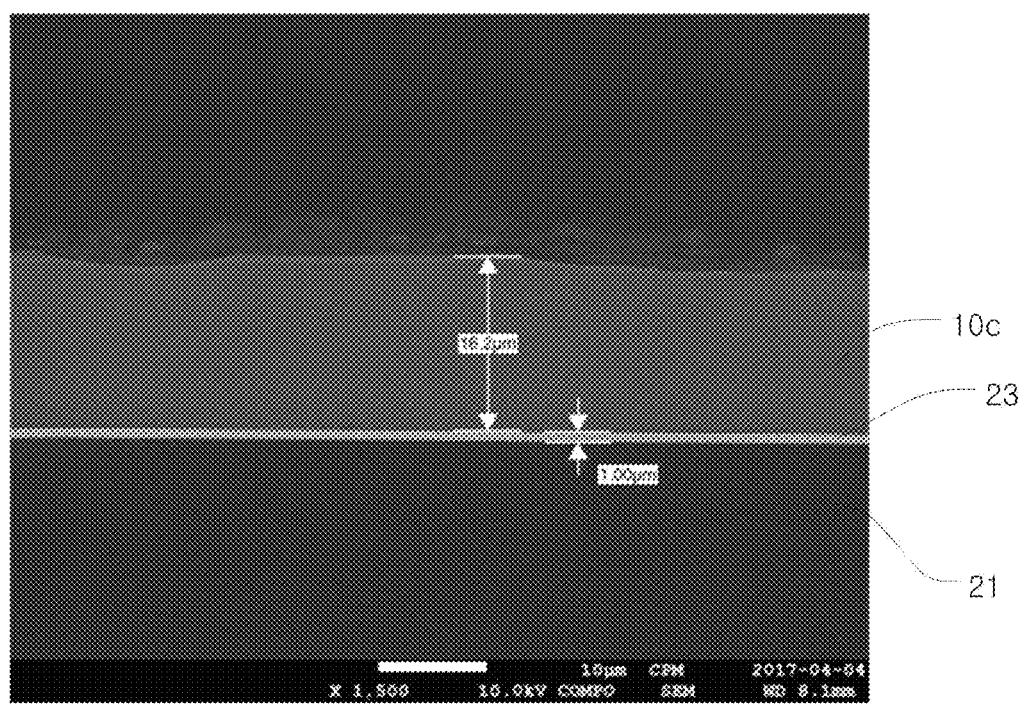
FIG. 4 is an image illustrating a cross-section of a structure, including a glass substrate, a barrier layer, and a metal thin film, in the embodiment illustrated in FIG. 3, the glass substrate having been first-etched before being second-etched.
Figure 5:
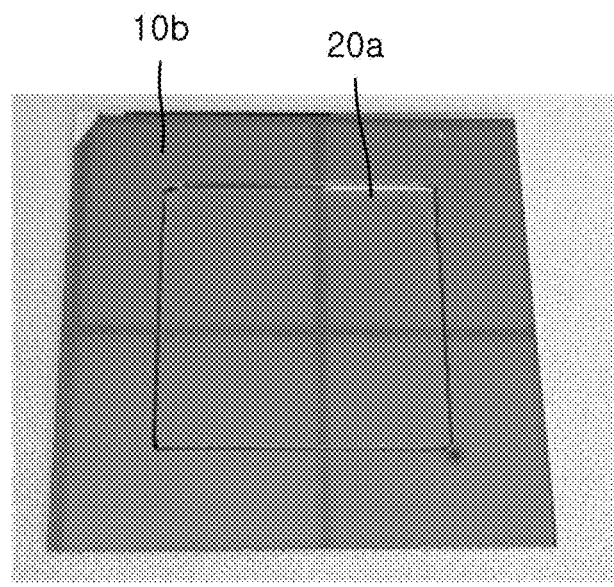
FIG. 5 is a bottom view illustrating the metal thin film supported by the glass support illustrated in FIG. 3.

FIG. 2 schematically illustrates a method of fabricating a metal thin film 21 supported by a glass support 10b according to a first embodiment, FIG. 3 schematically illustrates a metal thin film 21 supported by a glass support 10b according to a second embodiment, FIG. 4 is an image illustrating a cross-section of a structure, including a glass substrate, a barrier layer, and a metal thin film, in the embodiment illustrated in FIG. 3, the glass substrate having been first-etched before being second-etched, and FIG. 5 is a bottom view illustrating the metal thin film 21 supported by the glass support 10b illustrated in FIG. 3.

According to the methods illustrated in FIGS. 2 and 3, first, a glass substrate 10, on the top surface of which a layer 20 is formed, is prepared (preparation step). Afterwards, a local area 10a of the glass substrate 10 is etched from the bottom, so that the layer 20 is exposed downwardly (etching step). The layer 20 includes a metal thin film 21. In the preparation step, the layer 20 may be formed on the top surface of the glass substrate 10 by deposition.

Conventional selective etching of a glass substrate is undertaken as follows. First, an acid resistant film is attached to the glass substrate 10 and is then patterned. Afterwards, chemical etching is performed by bringing the glass substrate into physical contact with an etching solution using the patterned acid resistant film as a mask.

In general, an etching solution, such as hydrofluoric acid (HF), is used to etch a semiconductor substrate, such as a silicon (Si) substrate. However, when the etching solution for semiconductor substrates is used for etching a glass substrate, a relatively long etching time may cause damage to the acid resistant film, which is problematic. Thus, etching solutions for glass substrates include a variety of materials, such as nitric acid ($HNO_3$) and sulfuric acid ($H_2SO_4$), depending on the composition of glass, together with hydrofluoric acid, to increase the etching rate.

A barrier layer 23 may be disposed between the metal thin film 21 and the glass substrate 10 to prevent the metal thin film from being damaged by hydrofluoric acid when the glass substrate 10 is being etched. The barrier layer 23 may contain chromium (Cr) with or without hafnium (Hf). According to some embodiments, Cr may be a main component, and the weight of Hf may be less than 60% of the total weight of the barrier layer. In consideration of acid resistance against hydrofluoric acid, the amount of Hf may be less than that of Cr. The barrier layer 23 may be easily damaged by nitric acid and sulfuric acid, and consequently, the metal thin film 21 may be damaged or contaminated by the etching solution. According to some embodiments, the barrier layer 23 may be formed by i) laminating a SiC- or Teflon-based anti-acid film, ii) applying an anti-acid solution, or iii) deposition. According to some embodiments, the barrier layer 23 may have a thickness ranging from 0.001 μm to 5 μm. In some of such embodiments, the thickness of the barrier layer may range from 0.001 μm to 1 μm.

To prevent damage by hydrofluoric acid, precise etching in the range of several nanometers is necessary. However, such a level of precision is impossible due to the characteristics of wet etching. In addition, when partial over-etching is caused due to deviations in the thickness of the glass substrate 10, the metal thin film 21 is damaged.

To prevent the metal thin film from being damaged, the present disclosure suggests an etching process having two steps to achieve selective etching that can minimize damage to the metal thin film 21 formed on the glass substrate 10. Specifically, in the first etching step, the glass substrate 10 is first-etched to a depth less than the thickness of the glass substrate 10 using a first etching solution. For example, the etching depth may be obtained by multiplying the etching rate (i.e. etching depth per unit time) by elapsed time for etching. In the second etching step, the first-etched portion is second-etched using a second etching solution, so that the layer 20 is exposed downwardly.

The first etching solution is prepared by mixing an HF solution, a typical glass etching solution, with a chemical material, such as $HNO_3$ or $H_2SO_4$, at a predetermined mixture ratio to increase the etching rate of the glass substrate 10. For example, the mixture ratio of HF (20%), $HNO_3$, and $H_2SO_4$ may be 1:1:1 by weight. The chemical material may vary depending on the composition of glass. The addition of the chemical material can reduce the etching time by 50% or more compared to pure HF. Consequently, the glass substrate 10 can be etched at a fast rate to a depth close to the metal thin film 21 formed on the substrate 10. The etching may be performed, for example, for several to tens of seconds. In some embodiments, the etching temperature typically does not exceed 80° C.

The second etching solution may be prepared using pure HF alone. HF can selectively etch the glass substrate 10 while minimizing damage to the metal thin film 21, due to low reactivity with Cr or Cr—Hf thereof.

According to some embodiments, the first etching solution may include, by weight, hydrofluoric acid 50% to 100%, nitric acid 0% to 50%, and sulfuric acid 0% to 50%, while the second etching solution may include, by weight, hydrofluoric acid 50% to 100%.

The etching may be wet etching. In each etching step, the glass substrate 10 may be etched by a variety of methods depending on the composition and thickness thereof and the shape and area thereof to be etched. The glass substrate 10 may be etched by spray etching, or a plurality of the glass substrate 10 may be etched in a batch.

According to some embodiments, in room temperature and normal pressure conditions, the first etching rate may not exceed 10 μm per minute, and the second etching rate may range from 0.1 to 10 μm per minute.

The glass substrate 10 may include soda-lime glass. Alternatively, the glass substrate 10 may include glass which can be toughened by ion exchange (glass prior to being subjected to a chemical toughening process). For example, the glass substrate 10 may be provided using Gorilla® Glass or EXG® Glass available from Corning Incorporated.

Figure 6:
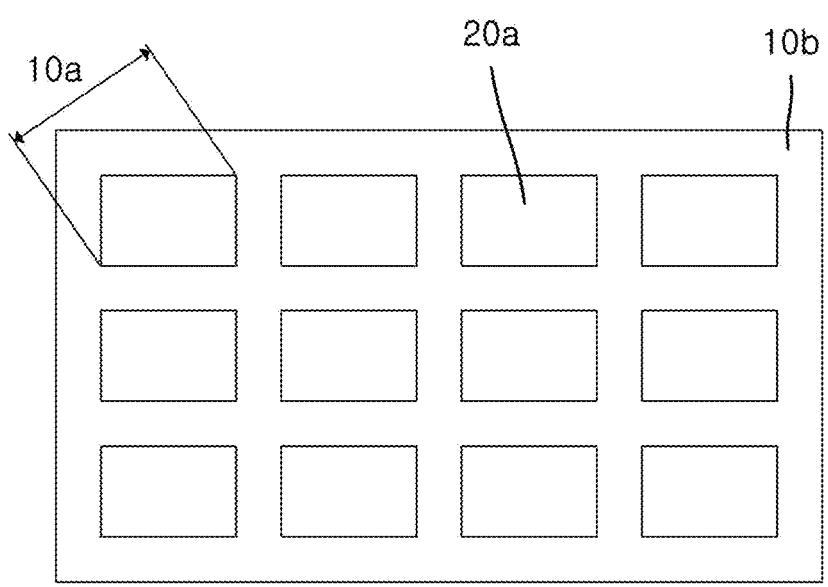
FIG. 6 schematically illustrates a metal thin film supported by a glass support according to a third embodiment.

In some embodiments, the present disclosure is applicable to a case in which the diameter of the circumscribed circle of the exposed area 20a of the layer 20 exposed after the etching may be 1 inch or greater. In some of such embodiments, the diameter of the circumscribed circle of the exposed area may be 3 inches or more. For example, as illustrated in FIG. 6, when the local area 10a (thus the exposed area 20a) is oblong, the diameter of the circumscribed circle of the exposed area is the length of a diagonal of the oblong figure.

According to some embodiments, prior to the formation of the metal thin film 21 on the glass substrate 10, a seed layer facilitating the formation of the metal thin film 21 may be provided on the glass substrate 10, and then, the metal thin film 21 may be provided on the seed layer. The seed layer may contain a conductive metal.

In some embodiments, the metal thin film 21 may be i) a Cr monolayer, ii) a Cr—Hf alloy monolayer, iii) a Cr—Ag multilayer or a Cr—Ti—Cu multilayer, or the like. In some embodiments, the metal thin film 21 may have a thickness in the range of nanometers to micrometers. In some embodiments, the metal thin film 21 may have a thickness not exceeding 10 μm. The metal thin film 21, according to some embodiments, may have a thickness of 1 μm to 5 μm.

The metal thin film 21 may be a metal thin film that is patterned prior to the etching step, or a step of patterning the metal thin film 21 after the etching step may be additionally provided. The metal thin film in which fine through-holes are patterned may be used as a fine-patterned mask for deposition, a water filter, or the like. In addition, the metal thin film may be coated with ceramic to be used as a battery separator.

FIG. 6 schematically illustrates a metal thin film 21 supported by a glass support 10b according to a third embodiment.

As illustrated in FIG. 6, a plurality of local areas 10a separated from each other may be provided. The plurality of local areas 10a may be arranged in a matrix (e.g. a 3×4 matrix in FIG. 6). However, the present disclosure is not limited thereto, but a variety of different arrangements are possible. In addition, the shape of a single local area 10a (and thus the shape of an exposed area 20a) may have a variety of other forms instead of being limited to an oblong shape.

REFERENCE NUMERALS

10: glass substrate, 10a: local area
10b: glass support, 20: layer
20a: exposed area, 21: metal thin film,
23: Barrier act

What is claimed is:

1. A method of fabricating a metal thin film-on-glass structure, comprising:
    preparing a glass substrate, on a top surface of which a layer is formed; and
    etching a local area of the glass substrate from a bottom of the glass substrate to expose the layer downwardly, thereby forming an exposed area of the layer,
    wherein the layer comprises a metal thin film, and
    wherein the etching comprises:
        first-etching the glass substrate to a depth less than a thickness of the glass substrate using a first etching solution containing hydrofluoric acid and at least one of nitric acid and sulfuric acid, resulting in a first-etched portion of the glass substrate; and
        second-etching the first-etched portion of the glass substrate using an etching solution containing hydrofluoric acid without nitric acid or sulfuric acid, so that the layer is exposed downwardly,
    whereby the metal thin film is supported by a remaining portion of the glass substrate.

2. The method of claim 1, wherein the glass substrate comprises soda-lime glass.

3. The method of claim 1, wherein the glass substrate comprises non-alkali glass.

4. The method of claim 1, wherein the glass substrate comprises glass which can be toughened by ion exchange.

5. The method of claim 1, wherein a diameter of a circumscribed circle of the exposed area is 1 inch or greater.

6. The method of claim 5, wherein the diameter of the circumscribed circle of the exposed area is 3 inches or greater.

7. The method of claim 1, wherein preparing the glass substrate comprises:
    forming a seed layer on the glass substrate, the seed layer comprising a conductive metal; and
    forming the metal thin film on the seed layer.

8. The method of claim 1,
    wherein the layer further comprises a barrier layer disposed between the metal thin film and the glass substrate.

9. The method of claim 8, wherein the barrier layer contains chromium with or without hafnium.

10. The method of claim 8, wherein the barrier layer is formed by i) laminating a SiC- or Teflon-based anti-acid film, ii) applying an anti-acid solution, or iii) deposition.

11. The method of claim 8, wherein the barrier layer has a thickness ranging from 0.001 μm to 5 μm.

12. The method of claim 1, wherein the first etching is performed at an etching rate of at most 10 μm per minute, and the second etching is performed at an etching rate ranging from 0.1 to 10 μm per minute.

13. The method of claim 1, wherein the first etching solution comprises, by weight, hydrofluoric acid 50% to 100%, nitric acid 0% to 50%, and sulfuric acid 0% to 50%, and
    the second etching solution comprises, by weight, hydrofluoric acid 50% to 100%.

14. The method of claim 1, wherein the etching is wet etching.

15. The method of claim 1, wherein the metal thin film has a thickness in a range of nanometers to micrometers.

16. The method of claim 15, wherein the thickness of the metal thin film ranges from 1 micrometer to 5 micrometers.

17. The method of claim 1, wherein the metal thin film is a patterned metal thin film, or
    the method further comprising patterning the metal thin film after etching the local area of the glass substrate.

18. The method of claim 1, wherein the glass substrate comprises a plurality of glass substrates, and
    the plurality of glass substrates are etched in a batch.

19. The method of claim 1, wherein the local area comprises a plurality of local areas separated from each other.

20. The method of claim 19, wherein the plurality of local areas are arranged in a matrix.

21. The method of claim 1, wherein the metal thin film comprises at least one selected from the group consisting of a Cr monolayer, a Cr—Hf alloy monolayer, a Cr—Ag multilayer, and a Cr—Ti—Cu multilayer.

* * * * *